United States Patent [19]

Shimada

[11] Patent Number: 5,239,605

[45] Date of Patent: Aug. 24, 1993

[54] OPTICAL SIGNAL RECEIVER MODULE HAVING LIGHT RECEIVER UNIT AND AMPLIFIER UNIT FIXED TOGETHER BY A RECEIVER OUTPUT TERMINAL INSERTED IN AN AMPLIFIER UNIT SUBSTRATE HOLE

[75] Inventor: Kazuhiro Shimada, Kawasaki, Japan

[73] Assignee: Kabushiki Kaisha Toshiba, Kawasaki, Japan

[21] Appl. No.: 890,794

[22] Filed: Jun. 1, 1992

[30] Foreign Application Priority Data

May 31, 1991 [JP] Japan ................................. 3-129794

[51] Int. Cl.$^5$ ............................ G02B 6/26; G02F 1/00; H01L 29/06
[52] U.S. Cl. ........................................ 385/88; 385/33; 385/49; 385/92; 385/93; 359/189; 359/193; 359/195; 257/653; 257/678
[58] Field of Search ............... 385/88, 92, 91, 93, 385/33, 34, 49; 359/154, 180, 189, 195, 193, 333, 341, 344, 345; 250/227.11; 357/17, 19, 20, 30, 40, 74, 84

[56] References Cited

U.S. PATENT DOCUMENTS

| | | | |
|---|---|---|---|
| 5,039,194 | 8/1991 | Block et al. | 385/88 |
| 5,069,522 | 12/1991 | Block et al. | 385/39 |
| 5,134,679 | 7/1992 | Robin et al. | 385/90 |
| 5,163,109 | 11/1992 | Okugawa et al. | 385/88 X |
| 5,165,002 | 11/1992 | Cumberledge et al. | 385/88 X |

Primary Examiner—Brian Healy
Attorney, Agent, or Firm—Foley & Lardner

[57] ABSTRACT

An optical signal receiver module having: a light receiver unit adapted to be mounted in a receptacle, the receptacle coupling the end portion of an optical fiber, the light receiver unit having a light receiver element for converting light from the optical fiber into an electric signal, the light being incident to one side face of the light receiver unit in the axial direction of the light receiver unit, the light receiver unit having an output terminal extending out of the light receiver unit in the axial direction on the other side face, and the output terminal outputting the electric signal from the light receiver element; and an amplifier unit having an amplifier element for amplifying the electric signal outputted from the light receiver element, the amplifier element being fixedly mounted on an amplifier substrate, the output terminal being adapted to be inserted into a hole formed in the amplifier substrate to mechanically fix the light receiver unit and the amplifier unit, and the output terminal being adapted to be electrically connected to the amplifier element.

21 Claims, 4 Drawing Sheets

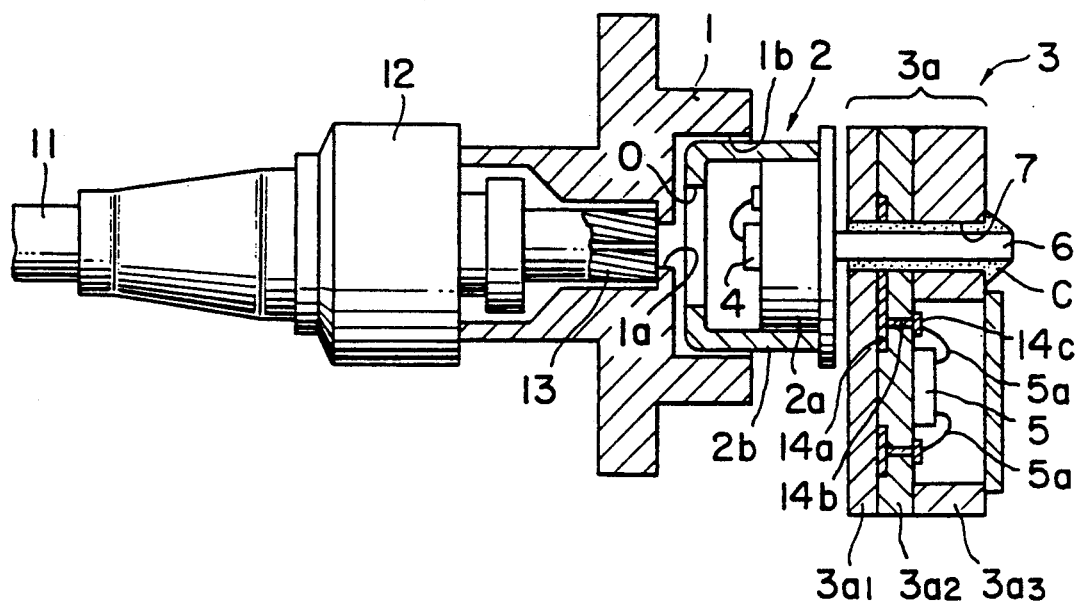
F I G. 3
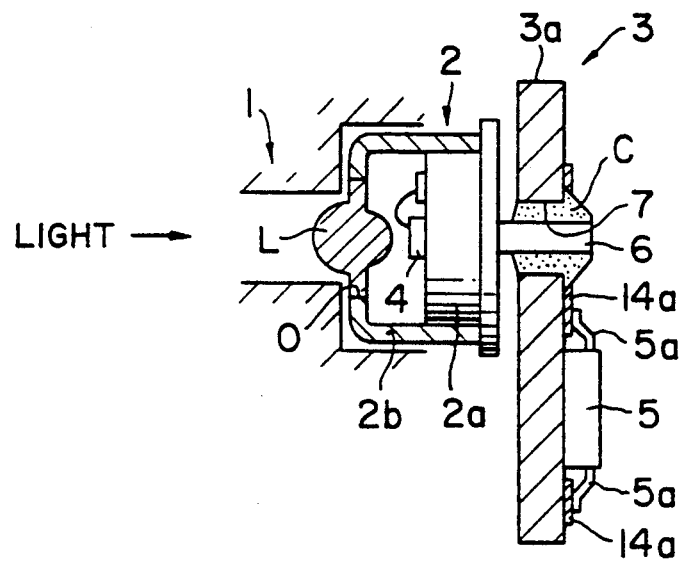
F I G. 4

OPTICAL SIGNAL RECEIVER MODULE HAVING LIGHT RECEIVER UNIT AND AMPLIFIER UNIT FIXED TOGETHER BY A RECEIVER OUTPUT TERMINAL INSERTED IN AN AMPLIFIER UNIT SUBSTRATE HOLE

FIELD OF THE INVENTION

The present invention relates to an optical signal receiver module, and more particularly to an optical signal receiver module for optical-to-electrical conversion in optical signal transmission systems via optical fibers.

BACKGROUND OF THE INVENTION

FIG. 1 is a cross sectional view of a conventional optical signal receiver module to be used for optical signal transmission via an optical fiber. As shown in FIG. 1, a light receiver unit 2 having a light receiver element 4 is fixed to a receptacle 1. The light receiver element 4 receives an input optical signal and converts it into an electric signal. The light receiver element 4 outputs the electric signal via a lead wire 6 to an amplifier unit 3. The amplifier unit 3 amplifies the electric signal received from the light receiver element 4 by an amplifier element 5 and outputs the amplified signal.

In assembly, the angle of the light receiver unit 2 is adjusted so that the light reception optical axis of the receptacle 1 aligns with the optical axis of the light receiver element 4. After angle adjustment, the light receiver unit 2 is fixedly mounted in the receptacle 1. The lead wire 6 extends out of the light receiver unit 2, generally perpendicular to the surface of the light receiver unit 2 opposite to the mounting surface of the light receiver element 4 on a substrate 2a. The amplifier unit 3 is therefore mounted generally parallel with the lead wire 6, i.e., generally parallel with the optical axis of incident light to the receptacle 1.

For the light receiver unit 2 whose optical axis is aligned with the receptacle 1, a common cylindrical member can be used and selected from general inexpensive package components. Therefore, a product can be made compact with excellent manufacturing operability. However, the light receiver unit 2 and amplifier unit 3 are mounted spaced apart from each other. Therefore, the lead wire 6 interconnecting both the units becomes long, and so stray capacitance increases. An output signal from the light receiver unit 2 is generally very small. As a result, it is susceptible to external noises, resulting in a poor S/N ratio. The input capacitance of the amplifier unit 3 also increases, degrading the frequency characteristic. Furthermore, the outer dimension of the module is long in the optical axis direction of incident light, imposing a limit in compacting the module.

FIG. 2 is a cross sectional view of another conventional light receiver module. As seen from FIG. 2, an amplifier element 5 together with a light receiver element 4 is packaged within a light receiver unit 2. In assembly, the light receiver unit 2 is first formed, and then fixed to a receptacle 1 with the optical axes of the receptacle 1 and light receiver element 4 being aligned with each other.

In the module shown in FIG. 2, the light receiver element 4 and amplifier element 5 are housed within the same package, making the interconnection therebetween as short as possible. As a result, this module is resistant to external noises, and the frequency characteristic can be effectively improved. However, the shape of the light receiver unit 2 is not of a general shape but is a specific shape. Namely, the light receiver unit 2 cannot use a generally cylindrical member commonly used, resulting in expensive package components. Components of such a specific shape also require specific mounting jigs, posing some manufacturing problems. The dimension of the module becomes long in the direction perpendicular to the optical axis of the receptacle, imposing a limit in compacting the module.

As described above, the conventional optical signal receiver modules have the following problems. The dimension of the module becomes long in the optical axis direction of the receptacle 1 or in the direction perpendicular to the optical axis, imposing a limit in compacting the module. It is also difficult to improve productivity, reduce cost, and improve the S/N ratio and frequency characteristic of such modules.

SUMMARY OF THE INVENTION

The present invention has been made in consideration of the above-described circumstances. It is an object of the present invention to provide an optical signal receiver module capable of having an improved S/N ratio and frequency characteristic and having the outer shape suitable for compacting the module.

The light receiver unit and amplifier unit are electrically interconnected by inserting a protrusion on one unit for coupling to the other unit. It is therefore possible to shorten a lead wire interconnecting both the units, improve electrical characteristics such as S/N ratio and frequency characteristic, compact the module, and improve productivity.

According to the present invention, it is possible to provide an optical signal receiver module which has excellent productivity, low manufacturing cost, and improved electrical characteristics such as S/N ratio and frequency characteristic, and is suitable for reduction of the outer dimension of the module.

BRIEF DESCRIPTION OF THE DRAWINGS

FIG. 3 is a cross sectional view of an embodiment of an optical signal receiver module according to the present invention.

FIG. 4 is a cross sectional view of a modification of the module shown in FIG. 3.

DESCRIPTION OF THE PREFERRED EMBODIMENTS

Figure 1:
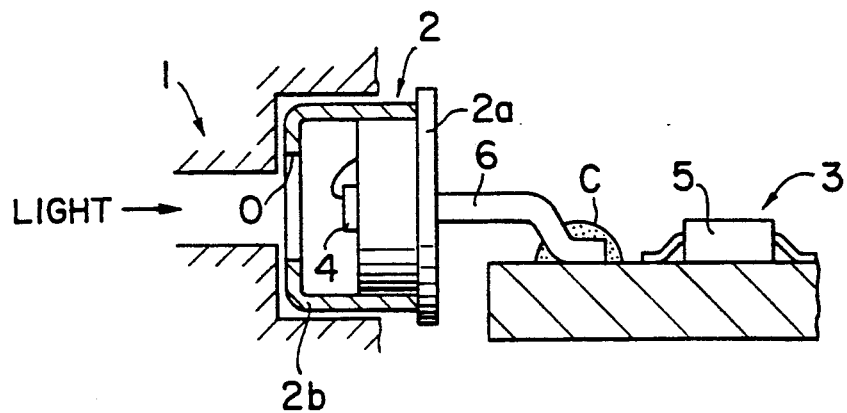
FIG. 1 is a cross sectional view of a conventional optical signal receiver module.

Preferred embodiments of the present invention will be described with reference to the accompanying drawings.

FIG. 3 is a cross sectional view of an optical signal receiver module according to an embodiment of the present invention. In FIG. 3, reference numeral 11 represent an optical fiber cord on one end of which an optical connector 12 is mounted. The optical connector 12 is fixed to a receptacle 1. The end portion of an optical fiber 13 faces a housing recess 1b through a hole 1a. Fitted in and fixed to this housing recess 1b is a light receiver unit 2 having an amplifier unit 3 fixed in advance.

The amplifier unit 3 is formed with a through hole 7 through which a lead wire 6 from the light receiver unit 2 of a generally cylindrical shape passes. It is to be noted that this lead wire 6 serves as a plug fitted in the through hole 7, and provides electrical and mechanical connection between the light receiver unit 2 and amplifier unit 3. The amplifier unit 3 is mounted on the back face of the light receiver unit 2 in tight contact therewith. The lead wire 6 passing through the through hole 7 is fixedly connected thereto by using conductive material C such as solder and conductive adhesive agent, to provide electrical connection to an amplifier element 5 such as a P-N junction semiconductor element of the amplifier unit 3. This electrical connection is realized by using a multi-layer substrate 3a of the amplifier unit 3 and by inter-layer wiring between the through hole 7 and amplifier element 5.

Specifically, the substrate 3a is constructed of substrate elements $3a_1$, $3a_2$ and $3a_3$ stacked one upon another. The through hole 7 is formed in this substrate. The lead wire 6 is inserted in and fixed to the through hole 7 by using conductive material C. The lead wire 6 is electrically connected to a lead 5a of the amplifier element 5, via a wiring pattern 14a, conductive member 14b passing through a hole in the substrate element $3a_2$, and wiring pattern 14c.

In assembly, the angle of the light receiver unit 2 is adjusted so that the light reception optical axis of the receptacle 1 aligns with the optical axis of the light receiver element 4. After angle adjustment, the light receiver unit 2 is fixedly mounted in the receptacle 1. The lead wire 6 extends out of the light receiver unit 2, generally perpendicular to the surface of the light receiver unit 2 opposite to the mount surface of the light receiver element 4 on the substrate 3a. The lead wire 6 is inserted into the through hole 7 of the amplifier unit 3, and fixedly connected thereto by using conductive material C, to provide electrical and mechanical connection between the light receiver unit 2 and amplifier unit 3. Light incident to the receptacle 1 is received by the light receiver element 4 of the light receiver unit 2, and converted into an electric signal to be supplied to the amplifier element 5 of the amplifier unit 3 via the lead wire 6.

For the light receiver unit 2 whose optical axis is aligned with the receptacle 1, a common cylindrical member can be used. Therefore, general and inexpensive package components can be used. Furthermore, the light receiver unit 2 can be made small, providing excellent manufacturing productivity. Since the light receiver unit 2 and amplifier unit 3 are mounted near each other, the lead wire 6 interconnecting both the units can be shortened reducing stray capacitance of the lead wire 6 and providing an accurate output signal from the light receiver unit 2 not susceptible to external noises. Since the input capacitance of the amplifier unit 3 becomes small, the frequency characteristic is less degraded. The dimension of the module is not required to be made long in the optical axis of the light receiving unit, allowing the direction of a compact module.

FIG. 4 is a cross sectional view of a modification of the module shown in FIG. 3. As shown in FIG. 4, as the substrate 3a of the amplifier unit 3, a printed circuit board may be used. Reference numeral 14a represents a wiring pattern. The printed circuit board 3a may have a wiring pattern on only one side thereof. The amplifier element 5 may use a molded amplifier element commonly used with printed circuit boards. In such a case, although the outer dimension becomes more or less large, the cost can be reduced further.

Figure 5:
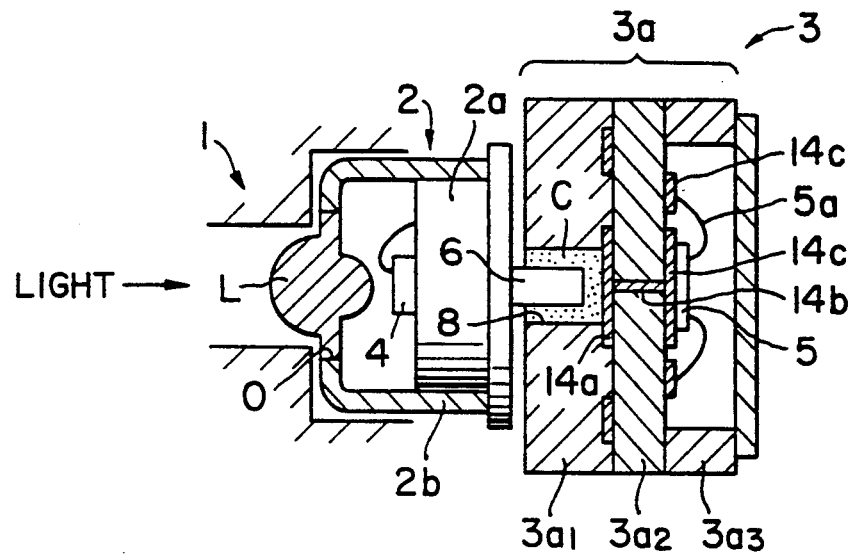
FIG. 5 is a cross sectional view of another embodiment of the optical signal receiver module according to the present invention.

FIG. 5 is a cross sectional view of an optical signal receiver module according to another embodiment of the present invention. In FIG. 5, an amplifier unit 3 is formed with a hole 8 into which a lead wire 6 from a light receiver unit 2 is inserted. The amplifier unit 3 is mounted on the back face of the light receiver unit 2 in tight contact therewith. The lead wire 6 is inserted in and fixed to the hole 8, to provide electrical connection to an amplifier element 5 of the amplifier unit 3. This electrical connection is realized by using a multi-layer substrate as the substrate 3a and by inter-layer wiring between the hole 8 and amplifier element 5.

Specifically, the substrate 3a is constructed of substrate elements $3a_1$, $3a_2$ and $3a_3$ stacked one upon another. The lead wire 6 is inserted in and fixed to the hole 8 by using conductive material C. The lead wire 6 is electrically connected to the bottom surface of the amplifier element 5, via conductive material C, wiring pattern 14a, conductive member 14b embedded in a through hole in the substrate element $3a_2$, and wiring pattern 14c.

In assembly, the angle of the light receiver unit 2 is adjusted so that the light reception optical axis of the receptacle 1 aligns with the optical axis of the light receiver element 4. After angle adjustment, the light receiver unit 2 is fixedly mounted in the receptacle 1. The lead wire 6 extends out of the light receiver unit 2, generally perpendicular to the surface of the light receiver unit 2 opposite to the mounting surface of the light receiver element 4 on the substrate 3a. The lead wire 6 is inserted into the hole 8 of the amplifier unit 3, and fixedly connected thereto by using conductive material C, to provide electrical connection between the light receiver unit 2 and amplifier unit 3. Light incident an the receptacle 1 is received by the light receiver element 4 of the light receiver unit 2, and converted into an electric signal to be supplied to the amplifier element 5 of the amplifier unit 3 via the lead wire 6.

The module of this embodiment constructed as above has the same advantageous effects as the embodiments described previously. For package components of the light receiver unit 2, general and inexpensive components can be used. Since a product can be made compact, excellent manufacturing productivity can be obtained. Since the stray capacitance of the lead wire 6 is reduced, an accurate output signal from the light receiver unit 2 is not susceptible to external noises, and the frequency characteristic is less degraded. The dimension of the module is not required to be made long in the optical axis direction of the light receiving unit, allowing a compact module.

Table 1 shows the comparison between the structures of the above-described embodiment modules and conventional modules, with respect to the distance between the light receiver unit 2 and amplifier unit 3, the outer dimension in the optical axis direction, and the cost of components.

TABLE 1

Figure 2:
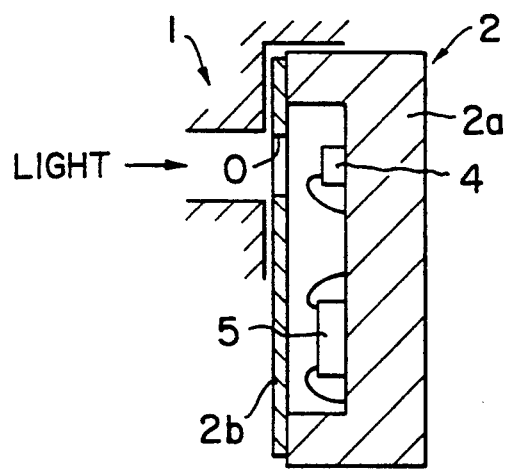
FIG. 2 is a cross sectional view of another conventional optical signal receiver module.

|  | Distance (mm) between light receiver unit and amplifier unit | Outer dimension (mm) in optical axis direction | Component cost |
| --- | --- | --- | --- |
| Structure of present invention | | | |
| Structure of FIG. 3 | 3 | 5 | Middle |
| Structure of FIG. 4 | 4 | 6 | Not expensive |
| Structure of FIG. 5 | 2 | 6 | Middle |
| Conventional structure | | | |
| Structure of FIG. 1 | 6 | 20 | Not expensive |
| Structure of FIG. 2 | 1 | 3 | Expensive |

In the above embodiments, the lead wire 6 extends from the light receiver unit 2 into the amplifier unit 3. Conversely, the lead wire may be extended from the amplifier unit 3 and inserted into the light receiver unit 2. In the drawings described previously and following drawings, reference character O represents an opening formed in a cover 2b of the light receiver unit 2, and L represents a light converging lens mounted at the opening O.

Figure 6:
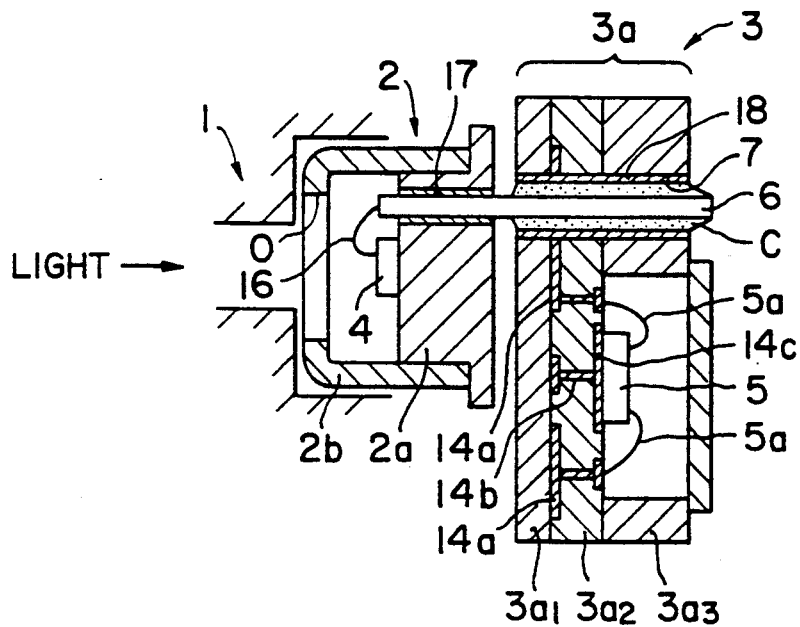
FIGS. 6 to 8 are cross sectional views of other embodiments corresponding to the modules shown in FIGS. 3 to 5, respectively.

FIG. 6 shows a modification of the module shown in FIG. 3. The different points of this module from that shown in FIG. 3 are as follows. A lead wire 6 is connected via a lead wire 16 to a light receiver element 4. The lead wire 6 passes through a substrate 2a with an insulating layer 17 interposed therebetween. A metal plating layer 18 such as Al is formed on the inner surface of a hole 7. The bottom face of an amplifier element 5 is electrically connected to a wiring pattern 14a via a wiring pattern 14c and conductive member 14b.

Figure 7:
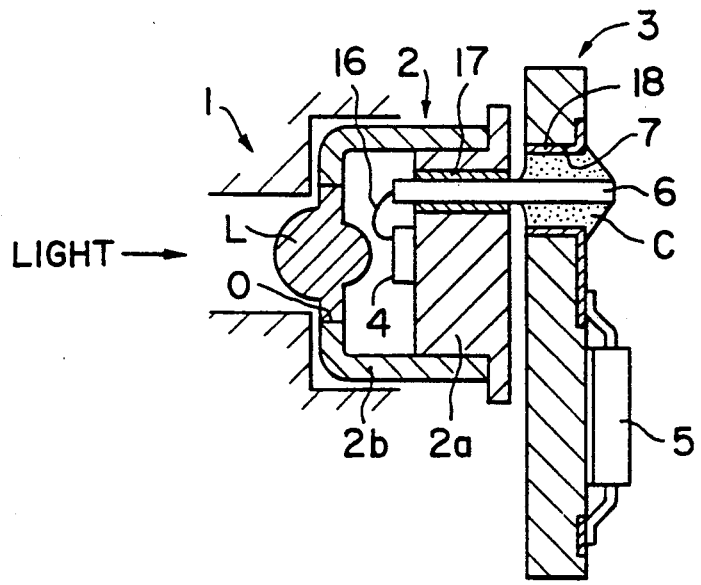

FIG. 7 shows a modification of the module shown in FIG. 4. The different points of this module from that shown in FIG. 4 are as follows. A lead wire 6 is connected via a lead wire 16 to a light receiver element 4. The lead wire 6 passes through a substrate 2a with an insulating layer 17 interposed therebetween. A metal plating layer 18 is formed on the inner surface of a hole 7.

Figure 8:
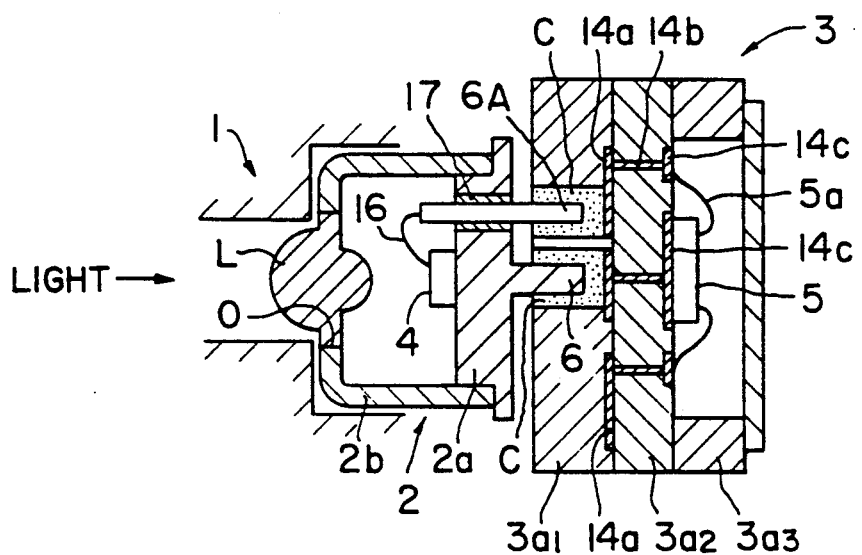

FIG. 8 shows a modification of the module shown in FIG. 5. The different points of this module from that shown in FIG. 5 are as follows. In addition to a lead wire 6, another lead wire 6A is provided. The lead wire 6A is connected via a lead wire 16 to a light receiver element 4. The lead wire 6A passes through a substrate 2a with an insulating layer 17 interposed therebetween, and is inserted into and fixed to a substrate element 3a₁ by using conductive material C. The lead wire 6A is electrically connected to a lead wire 5a of an amplifier element 5 via conductive material C, wiring pattern 14a, conductive material 14b and wiring pattern 14c.

Light receiver element 4 may be a P-N junction semiconductor element having a P-impurity layer and an N-impurity layer with one of these layers connected via a lead wire 16 to the lead wire 6A and the other of these layers connected to the light receiver substrate 2a which includes lead wire 6 integrally formed therewith.

What is claimed is:

1. An optical signal receiver module, comprising:
an optical fiber having an end portion for supplying light;
a receptacle for coupling to said end portion of said optical fiber;
a light receiver unit mounted in said receptacle with said light from said optical fiber being incident on one side face of said light receiver unit in an axial direction of said light receiver unit;
said light receiver unit having
a light receiver element for converting said light from said optical fiber into an electrical signal, and
an output terminal extending from said light receiver unit in said axial direction on another side face of said light receiver unit and outputting said electrical signal from said light receiver element; and
an amplifier unit for amplifying said electrical signal from said light receiver element,
said amplifier unit having
an amplifier substrate having a hole formed in said amplifier substrate, said output terminal being inserted in said hole to mechanically fix together said light receiver unit and said amplifier unit, and
an amplifier element fixedly mounted on said amplifier substrate and electrically connected to said output terminal.

2. An optical signal receiver module according to claim 1, wherein said light receiver unit includes a light receiver substrate and a cover attached to said light receiver substrate, a space being formed between a top surface of said light receiver substrate and an inner surface of a top wall of said cover, said light receiver element being mounted on said top surface of said light receiver substrate, an opening being formed in said top wall of said cover, and said light from said optical fiber being incident upon said light receiver element via said opening.

3. An optical signal receiver module according to claim 2, wherein a light converging lens is mounted at said opening of said cover, said light converging lens converging said light from said optical fiber upon said light receiver element.

4. An optical signal receiver module according to claim 3, wherein said amplifier substrate of said amplifier unit has a multi-layer structure with a plurality of substrate elements being stacked one upon another, a wiring pattern being formed on a surface of said substrate elements, and said output terminal and said amplifier element being electrically connected together via said wiring pattern.

5. An optical signal receiver module according to claim 4, wherein said output terminal comprises first and second output terminals, said light receiver element being a P-N junction semiconductor element having a P impurity layer and an N impurity layer, one of said P impurity layer and said N impurity layer being connected via a lead wire to said first output terminal, another of said P impurity layer and said N impurity layer being connected to said light receiver substrate, said light receiver substrate being made of conductive material and said second output terminal being integrally formed with said light receiver substrate.

6. An optical signal receiver module according to claim 5, wherein said light receiver unit is of a generally cylindrical shape.

7. An optical signal receiver module according to claim 3, wherein said amplifier substrate of said amplifier unit is a printed circuit board, a wiring pattern being formed on a surface of said printed circuit board, and said output terminal and said amplifier element being electrically connected together via said wiring pattern.

8. An optical signal receiver module according to claim 3, wherein said output terminal and said light receiver element are interconnected via a lead wire.

9. An optical signal receiver module according to claim 3, wherein said output terminal comprises first and second output terminals, said light receiver element being a P-N junction semiconductor element having a P impurity layer and an N impurity layer, one of said P impurity layer and said N impurity layer being connected via a lead wire to said first output terminal, another of said P impurity layer and said N impurity layer being connected to said light receiver substrate, said light receiver substrate being made of conductive material and said second output terminal being integrally formed with said light receiver substrate.

10. An optical signal receiver module according to claim 2, wherein said amplifier substrate of said amplifier unit has a multi-layer structure with a plurality of substrate elements being stacked one upon another, a wiring pattern being formed on a surface of said substrate elements, and said output terminal and said amplifier element being electrically connected together via said wiring pattern.

11. An optical signal receiver module according to claim 10, wherein said output terminal comprises first and second output terminals, said light receiver element being a P-N junction semiconductor element having a P impurity layer and an N impurity layer, one of said P impurity layer and said N impurity layer being connected via a lead wire to said first output terminal, another of said P impurity layer and said N impurity layer being connected to said light receiver substrate, said light receiver substrate being made of conductive material and said second output terminal being integrally formed with said light receiver substrate.

12. An optical signal receiver module according to claim 2, wherein said amplifier substrate of said amplifier unit is a printed circuit board, a wiring pattern being formed on a surface of said printed circuit board, and said output terminal and said amplifier element being electrically connected together via said wiring pattern.

13. An optical signal receiver module according to claim 2, wherein said output terminal comprises first and second output terminals, said light receiver element being a P-N junction semiconductor element having a P impurity layer and an N impurity layer, one of said P impurity layer and said N impurity layer being connected via lead wire to said first output terminal, another of said P impurity layer and said N impurity layer being connected to said light receiver substrate, said light receiver substrate being made of conductive material and said second output terminal being integrally formed with said light receiver substrate.

14. An optical signal receiver module according to claim 13, wherein said light receiver unit is of a generally cylindrical shape.

15. An optical signal receiver module according to claim 1, wherein said amplifier substrate of said amplifier unit has a multi-layer structure with a plurality of substrate elements being stacked one upon another, a wiring pattern being formed on a surface of said substrate elements, and said output terminal and said amplifier element being electrically connected together via said wiring pattern.

16. An optical signal receiver module according to claim 15, wherein said output terminal and said light receiver element are interconnected via a lead wire.

17. An optical signal receiver module according to claim 15, wherein said output terminal comprises first and second output terminals, said light receiver element being a P-N junction semiconductor element having a P impurity layer and an N impurity layer, one of said P impurity layer and said N impurity layer being connected via a lead wire to said first output terminal, another of said P impurity layer and said N impurity layer being connected to said light receiver substrate, said light receiver substrate being made of conductive material and said second output terminal being integrally formed with said light receiver substrate.

18. An optical signal receiver module according to claim 1, wherein said amplifier substrate of said amplifier unit is a printed circuit board, a wiring pattern being formed on a surface of said printed circuit board, and said output terminal and said amplifier element being electrically connected together via said wiring pattern.

19. An optical signal receiver module according to claim 18, wherein said output terminal and said light receiver element are interconnected via a lead wire.

20. An optical signal receiver module according to claim 1, wherein said output terminal and said light receiver element are interconnected via a lead wire.

21. An optical signal receiver module according to claim 1, wherein said light receiver unit is of a generally cylindrical shape.

* * * * *